(12) United States Patent
Birkner et al.

(10) Patent No.: US 7,770,392 B2
(45) Date of Patent: Aug. 10, 2010

(54) APPARATUS FOR CONTROLLING AN INTERNAL COMBUSTION ENGINE HAVING AN EXHAUST GAS TURBOCHARGER AND AN EXHAUST GAS RECIRCULATION APPARATUS

(75) Inventors: Christian Birkner, Irlbach (DE); Anselm Schwarte, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 306 days.

(21) Appl. No.: 11/814,233

(22) PCT Filed: Mar. 28, 2006

(86) PCT No.: PCT/EP2006/061107

§ 371 (c)(1),
(2), (4) Date: Jul. 18, 2007

(87) PCT Pub. No.: WO2006/106058

PCT Pub. Date: Oct. 12, 2006

(65) Prior Publication Data

US 2008/0104957 A1    May 8, 2008

(51) Int. Cl.
F02D 23/00    (2006.01)
F02M 25/07    (2006.01)
(52) U.S. Cl. ................ 60/602; 60/605.2; 701/108
(58) Field of Classification Search .......... 60/602, 60/605.2, 612; 701/103, 105, 108; 123/562, 123/568.12; F02B 37/00, 37/12, 37/24; F02M 25/07
See application file for complete search history.

(56) References Cited

U.S. PATENT DOCUMENTS 5,123,246 A * 6/1992 Younessi et al. ............ 60/602

(Continued)

FOREIGN PATENT DOCUMENTS

EP    1024261    1/2000

(Continued)

OTHER PUBLICATIONS

International Search Report; PCT/EP2006/061107; pp. 6, Jul. 5, 2006.

(Continued)

Primary Examiner—Thai Ba Trieu
(74) Attorney, Agent, or Firm—King & Spalding L.L.P.

(57) ABSTRACT

A control apparatus for an internal combustion engine has an exhaust-gas turbocharger regulator which, as a function of a setpoint boost pressure and an actual boost pressure, determines a controlled actuating-variable exhaust-gas back-pressure. An exhaust-gas recirculation regulator determines, as a function of a setpoint air mass flow and an actual air mass flow, a controlled actuating-variable exhaust-gas recirculation mass flow. A first decoupling unit determines a decoupling mass flow in an exhaust-gas section. A second decoupling unit determines a decoupling exhaust-gas back-pressure. A first conversion unit determines a signal for the exhaust-gas turbocharger actuator as a function of the pilot-control actuating-variable exhaust-gas back-pressure, the controlled actuating-variable exhaust-gas back-pressure and the decoupling mass flow. A second conversion unit determines a signal for the exhaust-gas recirculation valve as a function of the pilot-control actuating-variable exhaust-gas recirculation mass flow, the controlled actuating-variable exhaust-gas recirculation mass flow and the decoupling exhaust-gas back-pressure.

17 Claims, 3 Drawing Sheets

U.S. PATENT DOCUMENTS

| | | | |
|---|---|---|---|
| 5,228,292 A * | 7/1993 | Hanauer et al. | 60/602 |
| 6,035,639 A * | 3/2000 | Kolmanovsky et al. | 60/605.2 |
| 6,035,640 A * | 3/2000 | Kolmanovsky et al. | 60/605.2 |
| 6,067,800 A * | 5/2000 | Kolmanovsky et al. | 60/602 |
| 6,076,353 A * | 6/2000 | Freudenberg et al. | 60/605.2 |
| 6,128,902 A * | 10/2000 | Kolmanovsky et al. | 60/605.2 |
| 6,401,700 B2 * | 6/2002 | Balekai et al. | 60/605.2 |
| 6,460,522 B1 | 10/2002 | Rimnac | 60/605.2 |
| 6,681,573 B2 * | 1/2004 | Arnold | 60/602 |
| 7,016,779 B2 * | 3/2006 | Bowyer | 701/108 |
| 7,062,910 B2 * | 6/2006 | Inoue | 60/605.2 |
| 7,110,876 B2 * | 9/2006 | Uchiyama et al. | 60/605.2 |
| 2008/0078176 A1 * | 4/2008 | de Ojeda | 60/605.2 |

FOREIGN PATENT DOCUMENTS

| | | |
|---|---|---|
| EP | 1280990 | 3/2001 |
| EP | 1302646 | 10/2002 |
| WO | 01/75292 | 10/2001 |
| WO | 2004/027235 | 4/2004 |

OTHER PUBLICATIONS

Joachim Rückert et al.; "Simultane Regelung von Ladedruck und AGR-Rate"; Motortechnische Zeitschrift (MTZ); pp. 956-965, Nov. 2001.

Von Oliver Hild et al.; " Die Regelstrecke Eines Pkw-Dieselmotors mit Direkteinspritzung im Hinblick auf Ladedruck- und Abgasrückführregelung"; MTZ; pp. 186-192, 1999.

\* cited by examiner

APPARATUS FOR CONTROLLING AN INTERNAL COMBUSTION ENGINE HAVING AN EXHAUST GAS TURBOCHARGER AND AN EXHAUST GAS RECIRCULATION APPARATUS

CROSS-REFERENCE TO RELATED APPLICATIONS

This application is a U.S. national stage application of International Application No. PCT/EP2006/061107 filed Mar. 28, 2006, which designates the United States of America, and claims priority to German application number 10 2005 015 609.6 filed Apr. 5, 2005, the contents of which are hereby incorporated by reference in their entirety.

TECHNICAL FIELD

The invention relates to a device for controlling an internal combustion engine.

BACKGROUND

Increasingly stringent statutory regulations relating to permissible pollutant emissions of motor vehicles in which internal combustion engines are disposed make it necessary to minimize the pollutant emissions during operation of the internal combustion engine. This can be accomplished on the one hand by reducing the pollutant emissions that are produced during the combustion of the air/fuel mixture in the respective cylinder. For this purpose a precise metering of fresh air and recirculated exhaust gas is necessary. In particular dynamic operation with increasingly higher degrees of supercharging of internal combustion engines requires good control and regulation in order to reduce emissions during transient operation as well as to realize a convenient torque response.

For petrol as well as for diesel internal combustion engines it is known on the one hand to compress the aspirated air before it flows into the cylinders of the internal combustion engine, and on the other hand to recirculate exhaust gas discharging into an exhaust gas tract of the internal combustion engine after combustion to an external exhaust gas recirculation device and mix it with the fresh gas mass that is to be supplied. In this way nitrous oxide emissions in particular can be reduced as a result of a lower combustion temperature. In order to compress the intake air, use is often made of exhaust gas turbochargers whose drive is formed by means of a turbine which is disposed in the exhaust gas tract of the internal combustion engine and is mechanically coupled to a compressor in the intake tract of the internal combustion engine. Actuators are provided in each case for setting the compressor power output and also the exhaust gas mass that is to be recirculated. An intervention into the respective actuator of the external exhaust gas recirculation system or the exhaust gas turbocharger also has an effect in each case on the behavior of the respective other system, i.e. of the exhaust gas turbocharger or of the exhaust gas recirculation system.

A model-based predictive controller for simultaneously regulating the boost pressure and the EGR rate in a diesel engine is known on the one hand from the article titled "Simultane Regelung von Ladedruck und AGR-Verhalten beim PKW-Diesel-Motor" ("Simultaneous control of boost pressure and EGR behavior in automobile diesel engines"), Motortechnische Zeitschrift (MTZ) 11/2001, pages 956 ff.; also known, on the other hand, is a feedback control structure having controllers for the exhaust gas recirculation system and the exhaust gas turbocharger. The actuating variable of the controller assigned to the exhaust gas turbocharger is a variable turbine geometry setting. The output variable of the exhaust gas recirculation controller is a setting of an exhaust gas recirculation valve. In order to decouple the two control loops it is known from the above-cited technical article to provide decoupling elements whose input variables are in each case the actuating variables of the other controller and whose output variables are then added to the actuating variable of the respective controller.

A dynamic model of an internal combustion engine having an exhaust gas turbocharger and an exhaust gas recirculation system is known from a further technical article titled "Die Regelstrecke eines PKW-Dieselmotors mit Direkteinspritzung im Hinblick auf Ladedruck- und Abgasrückführ-Regelung" ("The controlled system of an automobile diesel engine with direct injection with regard to boost pressure and exhaust gas recirculation control"), MTZ 1999, pages 186 ff.

SUMMARY

A device for controlling an internal combustion engine may enable low-emission operation of the internal combustion engine by a device for controlling an internal combustion engine having at least one exhaust gas turbocharger with at least one exhaust gas turbocharger actuator, an exhaust gas recirculation device with an exhaust gas recirculation valve, wherein the device comprises an exhaust gas turbocharger controller which determines a feedback control actuating variable exhaust gas back pressure as a function of a setpoint boost pressure and an actual boost pressure; an exhaust gas recirculation controller which determines a feedback control exhaust gas recirculation actuating variable, as a function of a setpoint mass air flow and an actual mass air flow; a first decoupling unit which determines a decoupling mass flow in an exhaust gas tract downstream of a branch-off of the exhaust gas recirculation device and is dependent on the feedback control exhaust gas recirculation actuating variable, and a first conversion unit which determines an actuating signal for the exhaust gas turbocharger actuator as a function of the feedback control actuating variable exhaust gas back pressure and the decoupling mass flow.

BRIEF DESCRIPTION OF THE DRAWINGS

Exemplary embodiments of the invention are explained below with reference to the schematic drawings, in which.

Elements of identical construction or function are identified by the same reference symbols throughout the figures.

DETAILED DESCRIPTION

According to an embodiment, a device for controlling an internal combustion engine has an exhaust gas turbocharger which comprises an exhaust gas turbocharger actuator, and an exhaust gas recirculation device which comprises an exhaust gas recirculation valve. The control device may comprise an exhaust gas turbocharger pilot control which determines a pilot control actuating variable exhaust gas back pressure as a function of at least one operating variable of the internal combustion engine. Operating variables include both measured variables and any variables derived therefrom. Furthermore, an exhaust gas turbocharger controller is provided which determines a feedback control actuating variable exhaust gas back pressure as a function of a setpoint boost pressure and an actual boost pressure. Also provided is an exhaust gas recirculation pilot control which determines a pilot control actuating variable exhaust gas recirculation mass flow as a function of at least one operating variable of the internal combustion engine. An exhaust gas recirculation controller is provided which determines a feedback control actuating variable exhaust gas recirculation mass flow as a function of a setpoint mass air flow and an actual mass air flow.

The device also comprises a first decoupling unit which determines a decoupling mass flow in an exhaust gas tract downstream of an exhaust gas recirculation branch-off of the exhaust gas recirculation device, and specifically as a function of the pilot control actuating variable exhaust gas recirculation mass flow and the feedback control actuating variable exhaust gas recirculation mass flow. The device also comprises a second decoupling unit which determines a decoupling exhaust gas back pressure, and specifically as a function of the pilot control actuating variable exhaust gas back pressure and the feedback control actuating variable exhaust gas back pressure. A first conversion unit is provided which determines an actuating signal for the exhaust gas turbocharger actuator as a function of the pilot control actuating variable exhaust gas back pressure, the feedback control actuating variable exhaust gas back pressure and the decoupling mass flow. Also provided is a second conversion unit which determines an actuating signal for the exhaust gas recirculation valve as a function of the pilot control actuating variable exhaust gas recirculation mass flow, the feedback control actuating variable exhaust gas recirculation mass flow and the decoupling exhaust gas back pressure.

According to an embodiment, a particularly reliable and precise decoupling of the exhaust gas turbocharger and the exhaust gas recirculation device is easily possible in practice through the choice of the input and output variables of the decoupling units. In this way both the boost pressure and the mass air flow or the exhaust gas recirculation mass flow can easily be set very precisely even during simultaneous operation of the exhaust gas turbocharger and the exhaust gas recirculation device. In addition, a precise setting of a desired torque which is to be output by the internal combustion engine can also be achieved in this way.

According to an embodiment, an estimated variable unit is provided which includes a physical model of the internal combustion engine, which physical model is embodied for determining an estimated value of the mass flow in the exhaust gas tract downstream of the exhaust gas recirculation branch-off, and specifically as a function of at least one operating variable of the internal combustion engine, and which is further embodied for determining an estimated value of the exhaust gas back pressure as a function of at least one operating variable of the internal combustion engine, the first decoupling unit being embodied for determining the decoupling mass flow as a function of the estimated value of the mass flow in the exhaust gas tract downstream of the exhaust gas recirculation branch-off and/or the second decoupling unit being embodied for determining the decoupling exhaust gas back pressure as a function of the estimated value of the exhaust gas back pressure. In this way the decoupling mass flow and/or the decoupling exhaust gas back pressure can be determined even more precisely and consequently then the setpoint boost pressure and the setpoint mass air flow can also be actually set even more precisely.

According to a further embodiment, the first decoupling unit comprises a high-pass filter by means of which the sum of the pilot control actuating variable exhaust gas recirculation mass flow and the feedback control actuating variable exhaust gas recirculation mass flow is filtered. The first decoupling unit is embodied for determining the decoupling mass flow as a function of the filtered summation signal of the actuating variable exhaust gas recirculation mass flow. In this way use is made of the knowledge that the estimated values of the mass flow which are determined by means of the physical model of the internal combustion engine are very precise outside of a high-frequency range. In contrast, the summation signal maps imminent interventions of the exhaust gas recirculation system very precisely. It is thus easily possible to predict actuator movements and consequently to respond virtually free of delay and in this way to enable a very precise setting of the setpoint boost pressure.

In this connection it is advantageous if the first decoupling unit is embodied for determining the decoupling mass flow as a function of the filtered summation signal of the actuating variable exhaust gas recirculation mass flow, weighted with a predefined weighting factor. In this way an even more precise setting of the setpoint boost pressure can be ensured by suitable selection of the weighting factor.

According to a further embodiment, the second decoupling unit comprises a high-pass filter by means of which the sum of the pilot control actuating variable exhaust gas back pressure and the feedback control actuating variable exhaust gas back pressure is filtered, and the second decoupling unit is embodied for determining the decoupling exhaust gas back pressure as a function of the filtered summation signal of the actuating variable exhaust gas back pressure.

In this way use is made of the knowledge that the estimated value, determined by means of the physical model of the internal combustion engine, of the mass flow in the exhaust gas tract downstream of the exhaust gas recirculation branch-off is very precise outside of a high-frequency range. Use is also made of the knowledge that the summation signal of the actuating variable exhaust gas back pressure very precisely maps interventions of the exhaust gas turbocharger actuator, in particular imminent interventions, and consequently a virtually delay-free response of the exhaust gas recirculation valve to an intervention of the exhaust gas turbocharger actuator is easily possible. In this way the setpoint mass air flow can therefore be set extremely precisely.

In this connection it is also advantageous if the second decoupling unit is embodied for determining the decoupling exhaust gas back pressure as a function of the filtered summation signal of the actuating variable exhaust gas back pressure, weighted with a predefined weighting factor. In this way an even more precise setting of the setpoint mass air flow can be ensured by suitable selection of the weighting factor.

According to a further embodiment, the exhaust gas turbocharger comprises a turbine having variable turbine geometry, a turbine geometry actuator and a waste gate valve. The first conversion unit is embodied for generating an actuating signal for the turbine geometry actuator with the aim of varying the free flow cross-section of the turbine and for generating an actuating signal for the waste gate valve. The summation signal actuating variable exhaust gas back pressure is converted up to a threshold value by variation of the free flow cross-section with the waste gate valve closed. From the threshold value the summation signal actuating variable exhaust gas back pressure is converted by varying a degree of opening of the waste gate valve and moreover while maintaining the free flow cross-section of the turbine. In this way a very good response behavior of the exhaust gas turbocharger and a very precise setting of the setpoint boost pressure can be ensured.

According to a further embodiment, the supercharging comprises a first and second turbine arranged in series, to each of which a waste gate valve or a variable turbine geometry is assigned as actuator. The conversion unit is embodied for generating a first actuating signal for the actuator of the first turbine and for generating a second actuating signal for the actuator of the second turbine. The summation signal actuating variable exhaust gas back pressure is converted up to a threshold value by varying the first actuator while the position of the second actuator remains fixed. From the first threshold value the summation signal actuating variable exhaust gas back pressure is converted by varying the second actuator while the position of the first actuator remains fixed. In this way, too, a very precise setting of the setpoint exhaust gas back pressure is possible by means of the exhaust gas turbocharger.

An internal combustion engine (FIG. 1) comprises an intake tract 1, an engine block 2, a cylinder head and an exhaust gas tract 4. The intake tract 1 can communicate with the ambient air via an air filter 5. The intake tract 1 also comprises a compressor 7 of an exhaust gas turbocharger, also a charge air intercooler 9, a throttle valve 11, a manifold 13 and intake pipes 15 which extend from the manifold 13 as far as the cylinders in the engine block 2.

Figure 1:
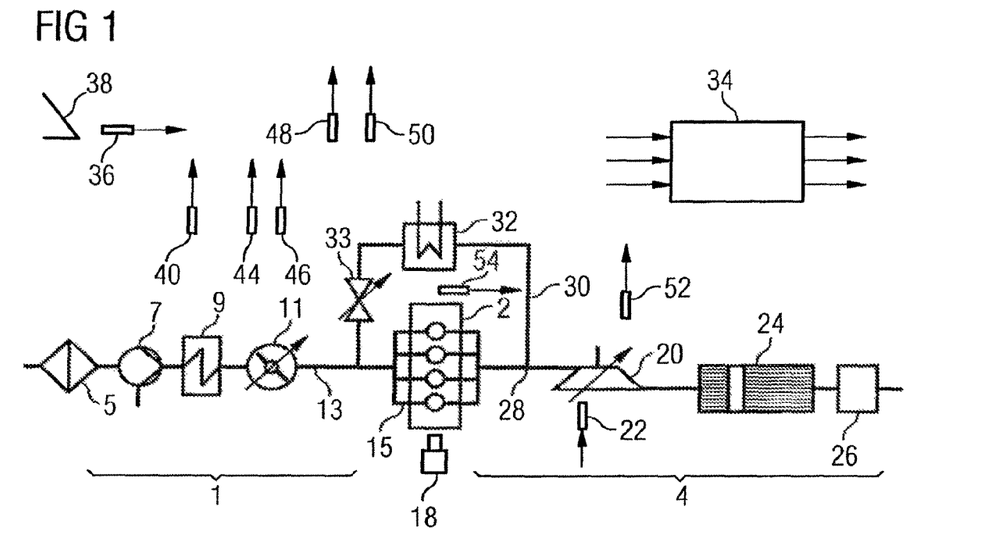
FIG. 1 shows an internal combustion engine having a control device.

The engine block comprises a crankshaft which is coupled to the piston of the respective cylinder via a connecting rod. The cylinder head comprises a valve actuating mechanism with gas inlet and gas outlet valves. The cylinder head further comprises injection valves 18 which are assigned to the respective cylinders.

The exhaust gas tract 4 comprises a turbine which is part of the exhaust gas turbocharger. The turbine 20 is assigned an exhaust gas turbocharger actuator 22. However, the exhaust gas turbocharger actuator 22 can also be assigned directly to the compressor 7. For example, the exhaust gas turbocharger actuator can be a turbine geometry actuator if the turbine 20 has a variable turbine geometry. It can, however, also be a waste gate valve which is disposed in a bypass to the turbine 20. Moreover it can also be disposed in a bypass to the compressor 11.

The exhaust gas tract 4 further comprises an exhaust gas catalyzer 24 and/or a particle filter. In addition it preferably comprises a muffler 26.

Embodied upstream in the direction of flow of the exhaust gas with regard to the turbine 20 is a branch-off 28 of an exhaust gas recirculation line 30 in the exhaust gas tract 4. The exhaust gas recirculation line 30 in combination with a cooler device 32 and an exhaust gas recirculation valve 33 forms an exhaust gas recirculation device. The exhaust gas recirculation device is embodied for recirculating exhaust gases which are discharged into the exhaust gas tract 4 from the respective cylinder of the internal combustion engine after the respective combustion process back into the manifold 13.

Also provided is a control device 34 to which are assigned sensors which record various measured variables and determine the value of the measured variable in each case. As a function of at least one of the measured variables the control device 34 determines actuating variables which are then converted into one or more actuating signals for controlling the actuators of the internal combustion engine by means of corresponding actuating drives. The control device 34 can also be referred to as a device for controlling the internal combustion engine.

The sensors are a pedal position sensor 36, which records an accelerator pedal position of an accelerator pedal 38, a mass air flow sensor 40, which records a mass air flow in the intake tract 1, a first temperature sensor 44, which records an intake air temperature, a boost pressure sensor 46, which records a boost pressure, a crankshaft angle sensor 48, which records a crankshaft angle to which a rotational speed is then assigned. Also provided is a second temperature sensor 50 which records a coolant temperature of the internal combustion engine. Additionally provided is an exhaust gas turbocharger sensor 52 which records, for example, a position of the variable turbine geometry or a position or a degree of opening of the waste gate valve. Also provided is an exhaust gas recirculation valve sensor 54 which records a position or a degree of opening of the exhaust gas recirculation valve.

Depending on the embodiment of the invention, any subset of the aforesaid sensors may be present or additional sensors may also be present.

The actuators are embodied for example as the throttle valve 11, the charge air intercooler 9, the exhaust gas turbocharger actuator 22, the exhaust gas recirculation valve 33, the cooler device 32 or the injection valve 18.

Figure 2:
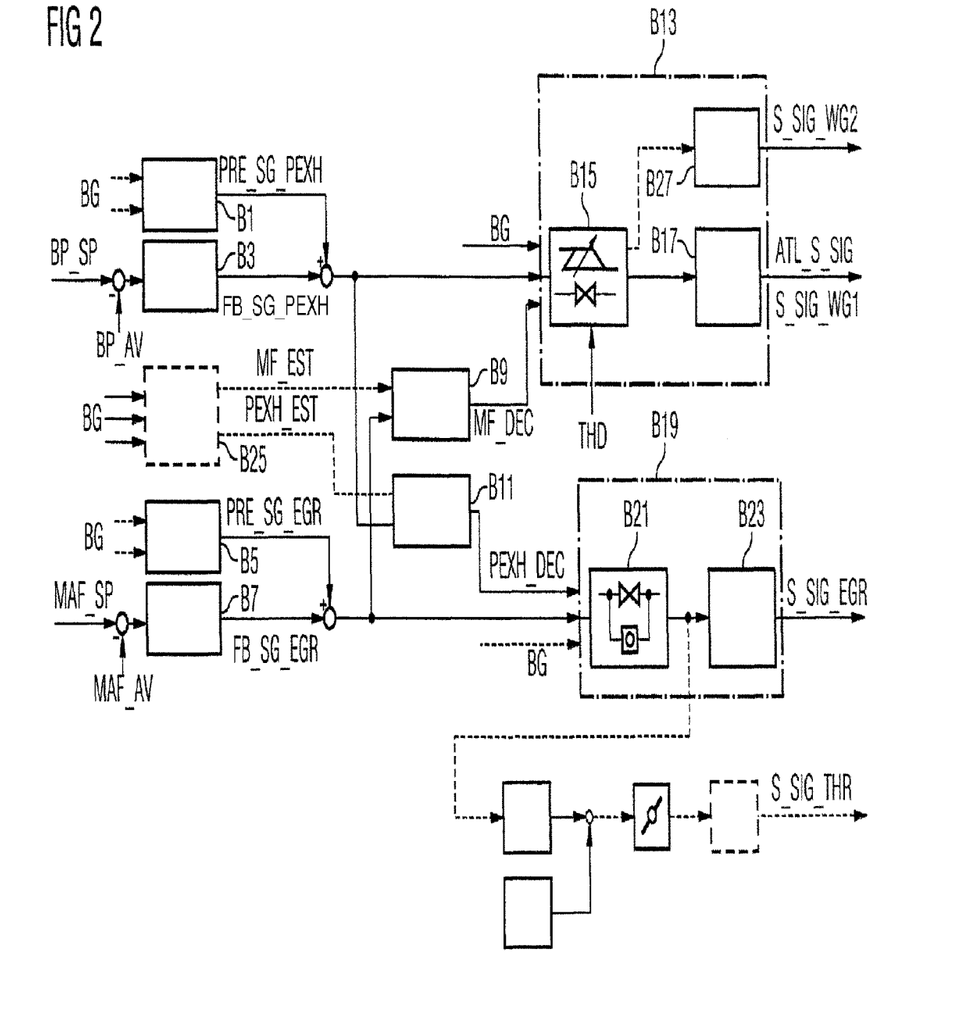
FIG. 2 is a block diagram of the control device.

With reference to the block diagram of FIG. 2, the functions of the control device 34 that are relevant to the embodiments are shown. However, the control device 34 preferably also comprises further functions in connection with the control of the internal combustion engine.

A block B1 comprises an exhaust gas turbocharger pilot control. The exhaust gas turbocharger pilot control is embodied for determining a pilot control actuating variable exhaust gas back pressure PRE_SG_PEXH as a function of at least one operating variable BG of the internal combustion engine. In addition to the measured variables, operating variables also include variables derived from these. The pilot control can comprise, for example, one or more engine characteristic maps.

A block B3 comprises an exhaust gas turbocharger controller which is preferably a P, PI or even a PID controller and to which a difference of a setpoint boost pressure BP_SP and an actual boost pressure BP_AV is supplied as a control deviation. The output variable of the block B3 is a feedback control actuating variable exhaust gas back pressure FB_SG_PEXH.

A block B5 comprises an exhaust gas recirculation controller which is embodied for determining a pilot control actuating variable exhaust gas recirculation mass flow PRE_SG_EGR as a function of at least one operating variable BG. For this purpose the block B5 preferably comprises at least one engine characteristic map.

A block B7 comprises an exhaust gas recirculation controller which is embodied, for example, as a P, PI or PID controller whose control deviation is a difference of a setpoint mass air flow in the intake tract and an actual mass air flow MAF_AV. The output variable of the block B7 is a feedback control actuating variable exhaust gas recirculation mass flow FB_SG_EGR.

A block B9 is provided which comprises a first decoupling unit. The first decoupling unit is embodied for determining a decoupling mass flow MF_DEC in the exhaust gas tract 4 downstream of the branch-off 28 of the exhaust gas recirculation line 30, and specifically as a function of the pilot control actuating variable exhaust gas recirculation mass flow PRE_SG_GR and the feedback control actuating variable exhaust gas recirculation mass flow FB_SG_GR. In the simplest case the first decoupling unit can comprise a predefined correcting value which is multiplicatively linked to the sum of the pilot control actuating variable exhaust gas recirculation mass flow PRE_SG_EGR and the feedback control actuating variable exhaust gas recirculation mass flow FB_SG_EGR. The correcting value is preferably predefined as a result of suitable experiments in such a way that a corresponding decoupling takes place.

Also provided is a block B11 which comprises a second decoupling unit. The second decoupling unit is embodied for determining a decoupling exhaust gas back pressure PEXH_DEC, and specifically as a function of the pilot control actuating variable exhaust gas back pressure PRE_SG_ PEXH and the feedback control actuating variable exhaust gas back pressure FB_SG_PEXH. For this purpose, in the simplest case said second decoupling unit also comprises a correcting value which is preferably multiplicatively linked to the sum of the pilot control actuating variable exhaust gas back pressure PRE_SG_PEXH and the feedback control actuating variable exhaust gas back pressure FB_SG_PEXH. In this case, too, the correcting value is suitably chosen and determined for example by means of simulations or experiments, and moreover in such a way that a decoupling of the exhaust gas recirculation device from the exhaust gas turbocharger takes place.

A block B13 comprises a first conversion unit which is embodied for determining at least one exhaust gas turbocharger actuating signal ATL_S_SIG. Said first conversion unit preferably comprises a block B15 with an inverse physical model of the part of the supercharging on the exhaust gas side. The model is embodied such that an input signal for a block B17 is determined by means of the sum of the pilot control actuating variable exhaust gas back pressure PRE_SG_PEXH and the feedback control actuating variable exhaust gas back pressure FB_SG_PEXH, the decoupling mass flow MF_DEC and preferably at least one further operating variable BG of the internal combustion engine. Preferably the inverse physical model comprises at least one engine characteristic map, preferably also a plurality thereof, by means of which, for example, a setpoint position or setting of the exhaust gas turbocharger actuator 22 can be determined. The at least one operating variable can be, for example, a pressure ratio after and before the turbine 20 and/or the pressure before the turbine 20 and/or an exhaust gas temperature and/or a rotational speed of the turbine.

The block B17 comprises a position closed loop for the exhaust gas turbocharger actuator which is embodied for determining the exhaust gas turbocharger actuating signal ATL_S_SIG as a function of the setpoint position, predefined by the block B15, of the exhaust gas turbocharger actuator 22 and preferably as a function of the actual setting or position of the exhaust gas turbocharger actuator 22 recorded by the exhaust gas turbocharger sensor 52. Based on the position of the exhaust gas turbocharger actuator it is possible, for example, to set a free flow cross-section of the turbine 20 or also a degree of opening of the waste gate valve.

A block B19 comprises a second conversion unit which is embodied for determining an exhaust gas recirculation valve actuating signal S_SIG_EGR as a function of the pilot control actuating variable exhaust gas recirculation mass flow PRE_SG_EGR, the feedback control actuating variable exhaust gas recirculation mass flow FB_SG_EGR, the decoupling exhaust gas back pressure PEXH_DEC and preferably at least one operating variable BG of the internal combustion engine.

The block B19 preferably comprises a block B21 which includes an inverse physical model of the exhaust gas recirculation device. By means of said inverse physical model of the exhaust gas recirculation device it is possible to determine a position of the exhaust gas recirculation valve that is to be set or a degree of opening of the exhaust gas recirculation valve 33 that is to be set. The model preferably comprises at least one engine characteristic map and is dependent on the pilot control actuating variable exhaust gas recirculation mass flow PRE_SG_EGR, the feedback control actuating variable exhaust gas recirculation mass flow FB_SB_EGR, the decoupling exhaust gas back pressure PEXH_DEC and preferably at least one operating variable which is, for example, a pressure ratio of the pressure downstream and upstream of the exhaust gas recirculation valve 33 and/or the temperature of the gas upstream of the exhaust gas recirculation valve 33.

The second conversion unit B19 also comprises a block B23 which includes a position control loop for the exhaust gas recirculation valve 33, the controller of the block B23 being supplied with the difference of the degree of opening, predefined, for example, by the block B21, of the exhaust gas recirculation valve and the degree of opening recorded by the exhaust gas recirculation valve sensor 54. The output variable of the block B23 is then the exhaust gas recirculation actuating signal S_SIG_EGR.

Where applicable, a throttle valve actuating signal S_SIG_THR for setting a degree of opening of the throttle valve 11 can also be adapted as a function of the output signal of the block B1. Corresponding blocks are then provided for that purpose.

Figure 3:
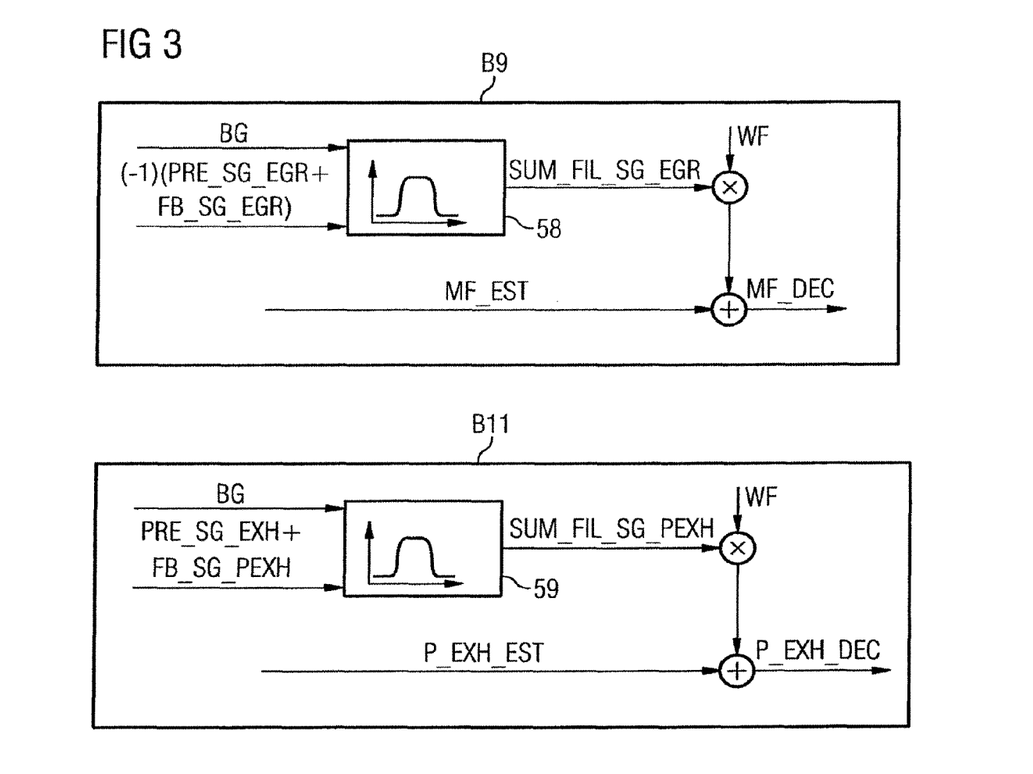
FIG. 3 is a more detailed representation of individual blocks of the block diagram according to FIG. 2.

Preferably provided is a block B25 which includes an estimated variable unit. The estimated variable unit includes a physical model of the internal combustion engine. It is embodied for determining different operating variables of the internal combustion engine and also, inter alia, estimated values MF_EST of the mass flow in the exhaust gas tract 4 downstream of the branch-off 28 of the exhaust gas recirculation line 30 and estimated values PEXH_EST of the exhaust gas back pressure. It preferably comprises a dynamic physical model of the intake tract, the gas exchange cycle in the cylinders and the combustion process and/or the exhaust gas tract 4 and/or the exhaust gas recirculation device 30. A physical model of this kind is also disclosed for example in the technical article titled "Die Regelstrecke eines PKW-Dieselmotors mit Direkteinspritzung im Hinblick auf Ladedruck- und Abgasrückführ-Regelung" ("The controlled system of an automobile diesel engine with direct injection with regard to boost pressure and exhaust gas recirculation control"), Motortechnische Zeitschrift 60, 1999, pages 188-190, the contents of which are included herein by reference. The physical model is in turn dependent on further operating variables BG of the internal combustion engine.

The first decoupling unit of the block B9 is then embodied for determining the decoupling mass flow MF_DEC as a function of the pilot control actuating variable exhaust gas recirculation mass flow PRE_SG_EGR, the feedback control actuating variable exhaust gas recirculation mass flow FB_SG_EGR and the estimated value MF_EST of the mass flow in the exhaust gas tract 4 downstream of the branch-off 28.

The first decoupling unit preferably comprises a first high-pass filter 58 which high-pass filters the sum of the pilot control actuating variable exhaust gas recirculation mass flow PRE_SG_EGR and the feedback control actuating variable exhaust gas recirculation mass flow FB_SG_EGR, and specifically preferably the negative sum, and hence determines a filtered summation signal SUM_FIL_SG_EGR of the actuating variable exhaust gas recirculation mass flow. The cut-off frequency of the high-pass filter is preferably suitably predefined. In this case the cut-off frequency is preferably dependent, inter alia, on the response time of the exhaust gas recirculation valve 33 and hence on the exhaust gas recirculation device. It can be particularly advantageous if the high-pass filter also filters out very high frequencies which represent merely parasitic frequencies of the signal. In this case it is embodied as a band-pass filter and also suitably parameterized.

The filtered summation signal SUM_FIL_SG_EGR of the actuating variable exhaust gas recirculation mass flow is preferably weighted by means of a weighting factor WF and then additively linked to the estimated value MF_EST of the mass flow in the exhaust gas tract 4 downstream of the branch-off 28 to the decoupling mass flow MF_DEC. The weighting factor can also be suitably predefined, thus, for example, by means of experiments or simulations. Preferably the parameters of the high-pass filter 58 or, as the case may be, of the band-pass filters can also be additionally dependent on at least one operating variable BG.

If the estimated variable unit is present, the second decoupling unit is furthermore also embodied such that it determines the decoupling exhaust gas back pressure PEXH_DEC in addition as a function of the estimated value PEXH_EST of the exhaust gas back pressure. For this purpose it preferably also comprises a further high-pass filter 59 which is embodied for filtering the pilot control actuating variable exhaust gas back pressure PRE_SG_PEXH and the feedback control actuating variable exhaust gas back pressure FB_SG_PEXH, and specifically preferably their sum, and which thus determines a filtered summation signal SUM_FIL_SG_PEXH of the actuating variable exhaust gas back pressure. Toward that end the cut-off frequency of the high-pass filter is also suitably predefined here, and moreover preferably by means of appropriate experiments or simulations. The filtered summation signal SUM_FIL_SG_PEXH of the actuating variable exhaust gas back pressure is then preferably weighted with the weighting factor WF. The weighting factor can also differ in its value from that of the block B9. The thus weighted filtered summation signal SUM_FIL_SG_PEXH of the exhaust gas back pressure is then additively linked to the estimated value PEXH_EST of the exhaust gas back pressure and hence the decoupling exhaust gas back pressure P_EXH_DEC is determined.

If an exhaust gas back pressure measured value is present, the estimated value of the exhaust gas back pressure PEXH_EST can easily be replaced.

Alternatively a pressure sensor can also be provided for recording the exhaust gas back pressure. The recorded exhaust gas back pressure can then be the input variable of the second decoupling unit as an alternative to the estimated value PEXH_EST of the exhaust gas back pressure.

By the interaction of the blocks B9, B11, B15 and B21 a largely delay-free and to that extent simultaneous response of the at least one exhaust gas turbocharger actuator 22 and the exhaust gas recirculation valve 33 can easily be ensured, whereby already imminent interventions of the respective other actuator can also be taken into account.

If the exhaust gas turbocharger is assigned, for example, two exhaust gas turbocharger actuators 22 which can be, for example, the turbine geometry actuator and the waste gate valve, it is preferably ensured initially in the block B15 that in order for the decoupling mass flow MF_DEC to exceed a predefined mass flow threshold value THD, only the actuating signal of the turbine geometry actuator is varied initially with the aim of varying the free flow cross-section of the turbine 20 and an actuating signal for the waste gate valve with the aim of varying a degree of opening of the waste gate valve is generated only when a threshold value THD is exceeded and moreover while maintaining the free flow cross-section of the turbine 20 present when the threshold value is exceeded, which flow cross-section is dependent on the position of the turbine geometry.

Figure 4:
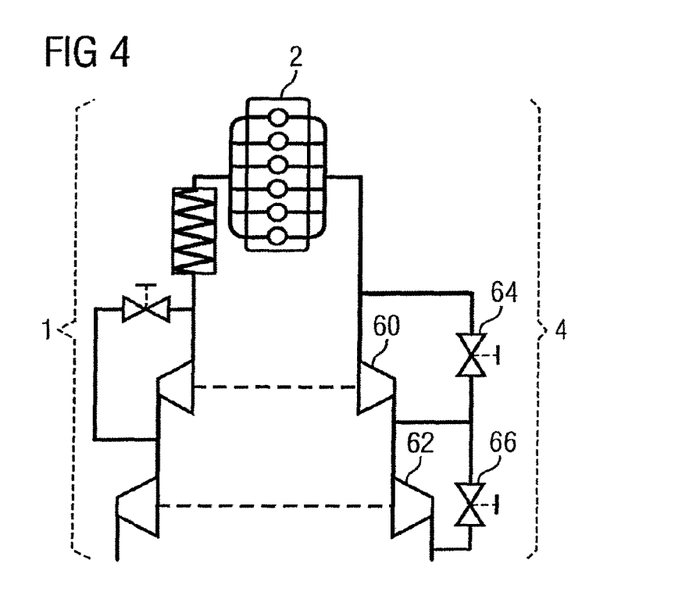
FIG. 4 shows a modified internal combustion engine.

Alternatively or in addition, the internal combustion engine can also comprise with regard to the exhaust gas turbocharger a step switching of two turbines 60, 62 with assigned first actuator and second actuator, e.g. waste gate valves 64, 66, as shown in FIG. 4. In this case there is then preferably provided a block B27 which is embodied according to the block B17 and which is embodied for generating an actuating signal S_SIG_WG2 for e.g. the second waste gate valve 66. The block B17 is then embodied for generating an actuating signal S_SIG_WG1 for e.g. the first waste gate valve 64. In this case the actuating signal S_SIG_WGL for controlling the first waste gate valve 64 is preferably varied until a threshold value THD is exceeded and the actuating signal S_SIG_WG2 for controlling the second waste gate valve 66 is varied only after the threshold value THD is exceeded while maintaining the degree of opening of the first waste gate valve 64.

What is claimed is:

1. A method for controlling an internal combustion engine having at least one exhaust gas turbocharger with at least one exhaust gas turbocharger actuator, an exhaust gas recirculation device with an exhaust gas recirculation valve, wherein the method comprising the steps of:

determining by an exhaust gas turbocharger controller a feedback control actuating variable exhaust gas back pressure as a function of a setpoint boost pressure and an actual boost pressure;

determining by an exhaust gas recirculation controller a feedback control exhaust gas recirculation actuating variable, as a function of a setpoint mass air flow and an actual mass air flow;

determining by a decoupling unit a decoupling mass flow in an exhaust gas tract downstream of a branch-off of the exhaust gas recirculation device which is dependent on the feedback control exhaust gas recirculation actuating variable, and determining by a conversion unit an actuating signal for the exhaust gas turbocharger actuator as a function of the feedback control actuating variable exhaust gas back pressure and the decoupling mass flow.

2. The method as claimed in claim 1, further comprising at least one of the steps of:

determining by an exhaust gas turbocharger pilot control a pilot control actuating variable exhaust gas back pressure as a function of at least one operating variable of the internal combustion engine, and determining by an exhaust gas recirculation pilot control a pilot control actuating variable exhaust gas recirculation mass flow as a function of at least one operating variable of the internal combustion engine, wherein the actuating signal for the exhaust gas turbocharger actuator is additionally dependent on the pilot control actuating variable exhaust gas back pressure and the decoupling mass flow is additionally dependent on the pilot control actuating variable exhaust gas recirculation mass flow.

3. The method as claimed in claim 1, further comprising at least one of the steps of:

determining by a second decoupling unit a decoupling exhaust gas back pressure, specifically as a function of a pilot control actuating variable exhaust gas back pressure and the feedback control actuating variable exhaust gas back pressure, and determining by an additional conversion unit an actuating signal for the exhaust gas recirculation valve as a function of a pilot control actuating variable exhaust gas recirculation mass flow, the feedback control actuating variable exhaust gas recirculation mass flow and the decoupling exhaust gas back pressure.

4. The method as claimed in claim 3, and further comprising:
an estimated variable unit which includes a physical model of the internal combustion engine,
wherein said physical model is embodied for determining an estimated value of the mass flow in the exhaust gas tract downstream of the branch-off, and as a function of at least one operating variable of the internal combustion engine, and
wherein said physical model is also embodied for determining an estimated value of the exhaust gas back pressure as a function of at least one operating variable of the internal combustion engine, and
wherein at least one of the decoupling unit embodied for determining the decoupling mass flow as a function of the estimated value of the mass flow in the exhaust gas tract downstream of the branch-off and the additional decoupling unit embodied for determining the decoupling exhaust gas back pressure as a function of the estimated value of the exhaust gas back pressure.

5. The method as claimed in claim 1, the feedback control exhaust gas recirculation actuating variable is a feedback control actuating variable exhaust gas recirculation mass flow.

6. A device for controlling an internal combustion engine having at least one exhaust gas turbocharger with at least one exhaust gas turbocharger actuator, an exhaust gas recirculation device with an exhaust gas recirculation valve, wherein the device comprises:
an exhaust gas turbocharger controller which determines a feedback control actuating variable exhaust gas back pressure as a function of a setpoint boost pressure and an actual boost pressure;
an exhaust gas recirculation controller which determines a feedback control exhaust gas recirculation actuating variable, as a function of a setpoint mass air flow and an actual mass air flow;
a decoupling unit which determines a decoupling mass flow in an exhaust gas tract downstream of a branch-off of the exhaust gas recirculation device and is dependent on the feedback control exhaust gas recirculation actuating variable, and
a conversion unit which determines an actuating signal for the exhaust gas turbocharger actuator as a function of the feedback control actuating variable exhaust gas back pressure and the decoupling mass flow.

7. The device as claimed in claim 6, wherein the device further comprises at least one of:
an exhaust gas turbocharger pilot control which determines a pilot control actuating variable exhaust gas back pressure as a function of at least one operating variable of the internal combustion engine, and
an exhaust gas recirculation pilot control which determines a pilot control actuating variable exhaust gas recirculation mass flow as a function of at least one operating variable of the internal combustion engine,
wherein the actuating signal for the exhaust gas turbocharger actuator is additionally dependent on the pilot control actuating variable exhaust gas back pressure and the decoupling mass flow is additionally dependent on the pilot control actuating variable exhaust gas recirculation mass flow.

8. The device as claimed in claim 6, wherein the device further comprises at least one of:
an additional decoupling unit which determines a decoupling exhaust gas back pressure, and specifically as a function of a pilot control actuating variable exhaust gas back pressure and the feedback control actuating variable exhaust gas back pressure, and
an additional conversion unit which determines an actuating signal for the exhaust gas recirculation valve as a function of a pilot control actuating variable exhaust gas recirculation mass flow, the feedback control actuating variable exhaust gas recirculation mass flow and the decoupling exhaust gas back pressure.

9. The device as claimed in claim 8, and further comprising an estimated variable unit which includes a physical model of the internal combustion engine,
wherein said physical model is embodied for determining an estimated value of the mass flow in the exhaust gas tract downstream of the branch-off, and as a function of at least one operating variable of the internal combustion engine, and
wherein said physical model is also embodied for determining an estimated value of the exhaust gas back pressure as a function of at least one operating variable of the internal combustion engine, and
wherein at least one of the decoupling unit embodied for determining the decoupling mass flow as a function of the estimated value of the mass flow in the exhaust gas tract downstream of the branch-off; and the additional decoupling unit embodied for determining the decoupling exhaust gas back pressure as a function of the estimated value of the exhaust gas back pressure.

10. The device as claimed in claim 8, wherein the additional decoupling unit comprises a high-pass filter by means of which a sum of the pilot control actuating variable exhaust gas back pressures and the feedback control actuating variable exhaust gas back pressure is filtered, and the second decoupling unit is embodied for determining the decoupling exhaust gas back pressure as a function of a filtered summation signal of the actuating variable exhaust gas back pressure.

11. The device as claimed in claim 10, wherein the additional decoupling unit is embodied for determining the decoupling exhaust gas back pressure as a function of the filtered summation signal of the actuating variable exhaust gas back pressure, weighted with a predefined weighting factor.

12. The device as claimed in claim 1, wherein the decoupling unit comprises a high-pass filter by means of which a sum of the pilot control actuating variable exhaust gas recirculation mass flow and the feedback control actuating variable exhaust gas recirculation mass flow is filtered, and the decoupling unit is embodied for determining the decoupling mass flow as a function of a filtered summation signal of the actuating variable exhaust gas recirculation mass flow.

13. The device as claimed in claim 12, wherein the decoupling unit is embodied for determining the decoupling mass flow as a function of the filtered summation signal of the actuating variable exhaust gas recirculation mass flow, weighted with a predefined weighting factor.

14. The device as claimed in claim 1, wherein the at least one exhaust gas turbocharger comprises:
a turbine having variable turbine geometry,
a turbine geometry actuator and a waste gate valve, wherein the conversion unit is embodied to generate an actuating signal for the turbine geometry actuator to vary a flow cross-section of the turbine up to a threshold value, and wherein the conversion unit is embodied for generating an actuating signal for the waste gate valve to vary a degree of opening of the waste gate valve if the threshold value is exceeded while maintaining the free flow cross-section of the turbine.

15. The device as claimed in claim 1, wherein the at least one exhaust gas turbocharger comprises first and second turbines arranged in series having a first and second actuator, respectively, wherein the conversion unit is embodied for generating an actuating signal to vary a degree of opening of the first actuator of the first turbine being disposed upstream of the second turbine, up to a threshold value, and wherein the conversion unit is embodied for generating an actuating signal to vary a degree of opening of the second actuator if the threshold value is exceeded, and while maintaining the degree of opening of the first actuator.

16. The device as claimed in claim 1, further comprising a throttle valve for assisting the exhaust gas recirculation flow.

17. The device in claim 1, wherein the feedback control exhaust gas recirculation actuating variable is a feedback control actuating variable exhaust gas recirculation mass flow.

* * * * *

UNITED STATES PATENT AND TRADEMARK OFFICE
CERTIFICATE OF CORRECTION

| | |
|---|---|
| PATENT NO. | : 7,770,392 B2 |
| APPLICATION NO. | : 11/814233 |
| DATED | : August 10, 2010 |
| INVENTOR(S) | : Christian Birkner et al. |

It is certified that error appears in the above-identified patent and that said Letters Patent is hereby corrected as shown below:

Title page, [30] Please insert the Foreign Application Priority Data as follows:

-- Apr. 5, 2005.............(DE) ............ 102005015609 --

Signed and Sealed this

Twenty-eighth Day of September, 2010

David J. Kappos
*Director of the United States Patent and Trademark Office*